Dec. 11, 1928.
J. W. TRAUGER
1,694,458
CONFECTION
Filed May 1, 1926
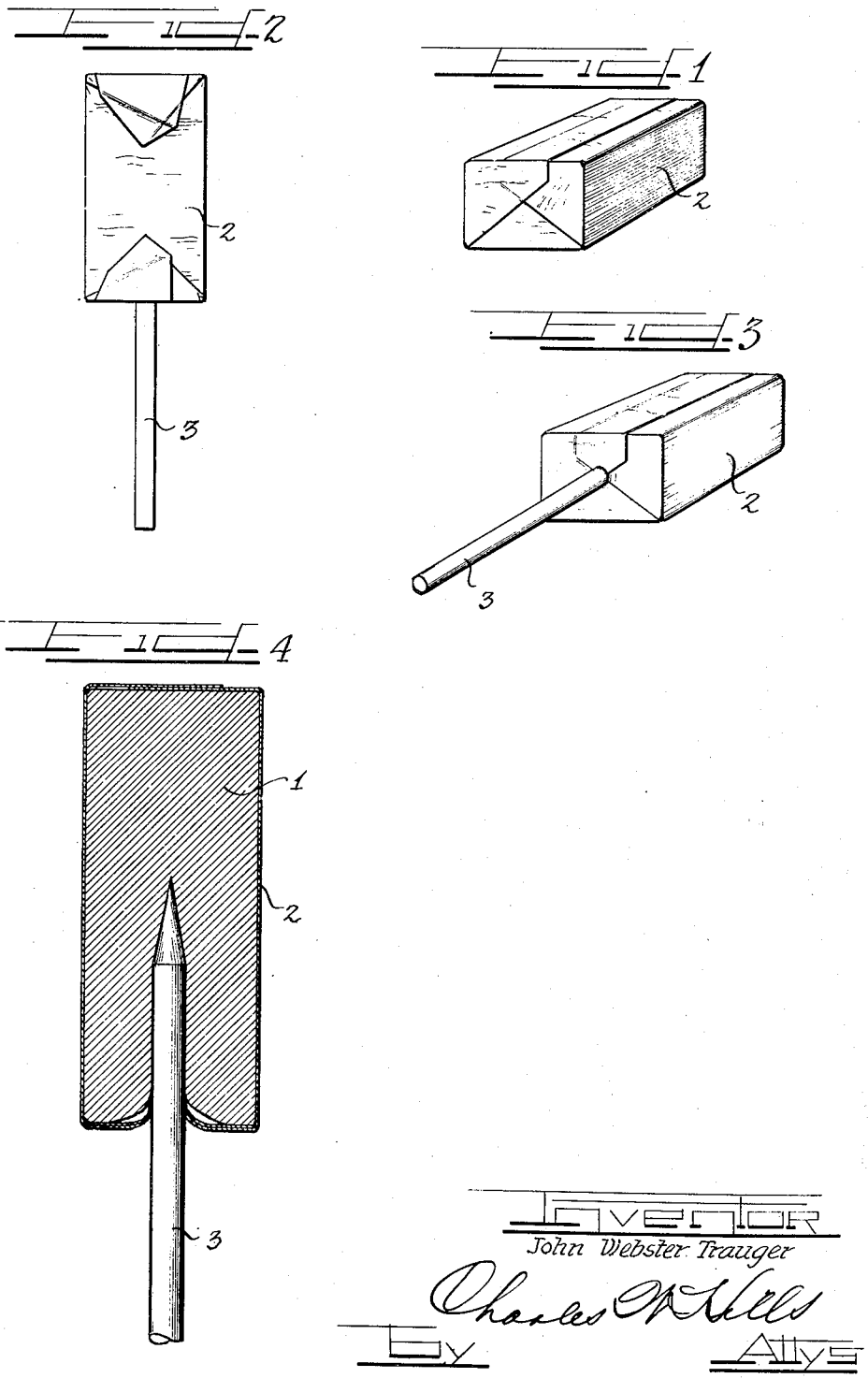
Inventor
John Webster Trauger
Charles W Hills
By          Attys Patented Dec. 11, 1928.

1,694,458

UNITED STATES PATENT OFFICE.

JOHN WEBSTER TRAUGER, OF BINGHAMTON, NEW YORK, ASSIGNOR TO FAIR PLAY CARAMELS, INC., A CORPORATION OF NEW YORK.

CONFECTION.

Application filed May 1, 1926. Serial No. 105,948.

This invention relates to confectionery and concerns itself with a wrapped and impaled sucker, and especially with the method of impaling the same.

In the past, it has been customary to mould the candy dough into proper form for a sucker, impale the same upon a suitable stick, and then apply the wrapper which would be twisted around the stick. By this method, the wrapper could not be firmly secured and in many cases, it would work loose, exposing the confectionery to injurious germs and dirt.

It is an object of this invention to overcome the foregoing objections, in the provision of a method whereby the confectionery is first securely wrapped, and then impaled, and whereby the impaling means tends to confine the wrapper at one end of the sucker.

The invention comprises the novel method and combination of parts hereinafter described and more particularly pointed out and defined in the appended claims.

In the accompanying drawings which illustrate a preferred form of this invention, and in which similar reference numerals refer to similar features in the different views:

Figure 1 is a perspective view of a piece of wrapped confectionery before the same is impaled.

Figure 2 is an elevational view of the impaled confectionery.

Figure 3 is a perspective view of the impaled confectionery.

Figure 4 is an enlarged sectional view through the impaled confectionery.

According to this invention, I form or mould the confectionery into suitable pieces 1 for consumption purposes. In the present instances, they are shown as of rectangular form, however any other shape will answer. I then wrap the pieces while they are still somewhat plastic, an operation which may be performed in a machine. Then while the wrapped pieces are in a plastic state, that is before they become hardened or set, I insert the impaling sticks 3, forcing them through the wrapper 2. While the sticks are being forced in, they will dent the ends of the confectionery pieces and partially draw the wrapper along so that the impaled sticks will tend to retain the wrappers upon the ends of the pieces.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. An article of commerce comprising a piece of confectionery, a wrapper thereon and folded over the ends thereof, and an impaling stick piercing one end of said piece of confectionery and extending through the folded end of said wrapper and tending to retain the same thereon.

2. An article comprising a piece of confectionery having a wrapper thereon, said wrapper having end folds, and an impaling stick piercing said folds and drawing the same inwardly.

In testimony whereof I have hereunto subscribed my name.

JOHN WEBSTER TRAUGER.